United States Patent
Hollins

[15] 3,705,497
[45] Dec. 12, 1972

[54] VEHICLE ENGINE EMISSIONS CONTROL SYSTEM

[72] Inventor: Jesse R. Hollins, 1 Chester Drive, Great Neck, N.Y. 11021

[22] Filed: May 10, 1971

[21] Appl. No.: 141,546

[52] U.S. Cl. .................. 60/283, 60/288, 60/310, 123/119 B, 60/278
[51] Int. Cl. ............................................. F02b 75/10
[58] Field of Search ...60/29 A, 29 F, 30 R, 283, 288, 60/310; 123/119 B, 41.86; 180/105, 108

[56] References Cited

UNITED STATES PATENTS

| | | | |
|---|---|---|---|
| 2,118,633 | 5/1938 | White | 123/119 B |
| 2,488,563 | 11/1949 | Sills | 60/30 L |
| 2,681,051 | 6/1954 | Robinson | 123/119 B |
| 3,282,046 | 11/1966 | Walker | 60/29 F |

FOREIGN PATENTS OR APPLICATIONS

| | | | |
|---|---|---|---|
| 1,216,496 | 11/1959 | France | 60/288 |

*Primary Examiner*—Douglas Hart
*Attorney*—Kirschstein, Kirschstein, Ottinger & Frank

[57] ABSTRACT

A system for directing the exhaust emissions of a vehicle internal combustion engine through a treatment means and fumes from the engine crankcase to the air intake system of the engine when the vehicle is moving below a predetermined speed, and for directing the above mentioned exhaust emissions and crankcase fumes to the atmosphere when the vehicle is moving at or above said predetermined speed.

14 Claims, 3 Drawing Figures

PATENTED DEC 12 1972

INVENTOR
JESSE R. HOLLINS
BY *Knechtel, Knechtel, Ottinger & Fiorill*

ATTORNEYS

VEHICLE ENGINE EMISSIONS CONTROL SYSTEM

BACKGROUND OF THE INVENTION

1. Field of the Invention

Vehicle engine emissions control system.

2. Description of the Prior Art

With recent increased interest in ecology there has been a great deal of attention directed to controlling the emissions of a vehicle internal combustion engine. Many approaches have been taken by the vehicle manufacturers regarding this problem.

Some approaches have involved passing the exhaust emissions from the engine through an afterburner or through a receptacle containing a catalyst or some suitable absorbing or reactant chemical so that the objectionable oxides and unburned hydrocarbons of the exhaust emissions from the engine were removed and not passed to the atmosphere or converted so as not to be as objectionable when passed to the atmosphere.

Another approach involved returning a small fraction of the exhaust emissions from the engine back to the engine intake manifold in combination with fresh air, together with the gasoline/air mixture, for recombustion in the engine. A disadvantage of this return is that it required an enriched gasoline/air mixture to maintain the engine in good operation, which decreased fuel economy.

Furthermore, an enriched gasoline/air mixture combined with the exhaust emissions caused increased carbonization of the engine compression chambers, the piston heads, the valve heads and seats and the spark plugs and their electrodes. This results in the misfiring of spark plug electrodes, leaking of cylinder compression through unevenly carbonized valve seats, loss of engine power and rough engine operation, in addition to increasing the emission of unburned fuel. As a consequence, frequent spark plug replacement, valve seat grinding, cylinder head and cylinder compression chamber cleaning is required.

Since only a limited amount of the engine exhaust emissions can be recirculated, the remainder of the exhaust emissions pass through the exhaust system and enter the atmosphere untreated.

Another method of treating the engine exhaust emissions is by causing all these exhaust emissions to pass through a catalytic or chemical treating means, which treating means is incorporated in the engine exhaust system. This method of treating the engine exhaust emissions appears to be more efficient. However, it has certain drawbacks, including: increasing engine exhaust back pressure and necessitating increased engine idling speed. Engine exhaust back pressure also increases as the speed of the engine is increased thereby reducing the accelerating ability of the engine. In addition, catalysts and chemical reactants have a limited life efficiency and require frequent renewal. This is because the catalyst becomes contaminated and the chemical reactants consumed — all of these occurrences happening after a relatively brief period of time. The costs of catalysts and chemical reactants is high and their availability is limited. The labor cost of their removal from and replacement into their receptacles in the engine exhaust system is expensive.

Furthermore, the discharge to atmosphere of fumes from the engine crankcase is another engine emission that contributes to air pollution. These fumes are, generally speaking, of two types. One is the fumes rising from oil in the crankcase, that is to say, vaporized oil, and the other is the products of combustion from the firing chambers, which products of combustion include unburned hydrocarbons. These products of combustion, depending on the state of the engine cylinders and the piston rings, blow past the piston rings to a greater or lesser extent, and enter the crankcase space. In order to alleviate this cause of air pollution the art uses positive crankcase ventilation which constitutes directing the fumes from the crankcase to the carburetor/air intake filter, or to the engine intake manifold, or to the fuel/air carbureted section, sometimes referred to as the lower section of the carburetor. As a result these crankcase fumes reach the engine firing chambers along with the fuel/air mixture, and are exhausted together with the engine emissions after the firing cycle of the engine. However, the fumes from the lubricating oil do not have as low a flash point as the fuel/air mixture from the carburetor, so that the burning of these fumes is incomplete and there is a tendency to leave oily carbon after the firing is completed. This oily carbon which actually is a soot, forms a film which adheres to the firing chamber walls, pistons, valve surfaces, valve seats, spark plugs and spark plug electrodes in a greater amount than the residue deposited thereon by the unadulterated fuel/air mixture. Hence, positive crankcase ventilation retards efficient operation of the engine. As the valves and valve seats become coated with the sooty carbon, the valves become leaky resulting in a loss of compression and firing efficiency. In addition, the oily carbonization of the spark plug electrodes results in spark plug misfiring, creating uneven or poor ignition. As a result of these adverse effects of positive crankcase ventilation, more frequent spark plug replacement and more frequent engine maintenance is required to maintain the engine in good operating efficiency.

When vehicles move in the urban areas at low restricted speeds, in stop and go traffic, in concentrated traffic conditions, or standing still with the engine running their engine exhaust emissions and crankcase emissions should be treated by methods that will reduce, or if possible, eliminate their toxic effects.

However, when vehicles are moving at high speeds under unrestricted (not congested) traffic conditions, the amount of fuel consumed by the engine in a limited area is so minute that the toxic effects on the atmosphere of the engine exhaust emissions and crankcase fumes is hardly measurable. Furthermore, vehicles moving at high speeds are spaced so far apart, that the amount of toxic exhaust emissions and crankcase fumes mixed into the vast amount of surrounding atmosphere greatly weakens or practically eliminates the toxic effects of the engine emissions.

SUMMARY OF THE INVENTION

Purposes of the Invention

An object of the present invention is to provide a system for directing the fumes from the crankcase of a vehicle internal combustion engine to the engine combustion chamber through the engine air intake when the vehicle is moving below a predetermined speed or is standing still with the engine running, and for directing said crankcase fumes to ambient atmosphere when the vehicle is moving at/or above said predetermined speed.

A further object of the present invention is to provide a system wherein the exhaust emissions of a vehicle internal combustion engine are directed to a treating means when the vehicle is traveling below a predetermined speed or is standing still with the engine running, and wherein the exhaust emissions bypass the treating means and pass directly to atmosphere when the vehicle is traveling at/or above the predetermined speed.

Other objects of the invention will be pointed out hereinafter.

BRIEF DESCRIPTION OF THE INVENTION

In accordance with the present invention, the foregoing and other objects are achieved in an emissions control system for a vehicle having an internal combustion engine with a control mechanism responsive to the vehicle moving at/or above a predetermined speed. This speed corresponds to the speed below which it is desirable to reduce as much as possible or to eliminate the direct discharge to the ambient air of objectional emissions products of the vehicle internal combustion engine, and at/or above said predetermined speed, such reduction or elimination not being necessary. The means for operating the control mechanism can be conventional, e.g. a wind tunnel shutter, an rpm sensor actuated in response to the speed of rotation of the speedometer cable, the rotation of a vehicle wheel, or any other variable speed rotating member of the vehicle engine or drive train assembly. Although a conventional three-way vacuum control valve is shown for the control mechanism, electric operated control mechanisms in combination with geared electric motors, or electric solenoids for operating the shutter assemblies of the emissions diverting units may be used.

In the preferred embodiment of the present invention the control mechanism consists of a wind tunnel which receives ram air and includes a shutter at the outlet end thereof against which ram air in the tunnel is directed. The shutter is spring loaded to a position in which it closes the outlet end of the wind tunnel until pressure of ram air entering the tunnel is of sufficient force to overcome the spring loading at which time the shutter moves away from the outlet end. This happens when the vehicle is traveling at and above the predetermined speed. The spring loading of the shutter is adjustable to enable the shutter to be open at any selected vehicle speed.

A conventional vacuum control valve is actuated by movement of the shutter. The valve connects a control conduit either to (a) an engine affiliated source of negative (subatmospheric) pressure such as the intake manifold, or (b) the atmosphere. A first cylinder is in communication with the control conduit, a first piston being housed therein. A rod is attached to the first piston and spring biasing means urges the first piston into a first position when ambient air pressure prevails in the control conduit. Movable with the piston rod is a hinged shutter arm which is located in a crankcase plenum. The plenum is in communication with the crankcase of the internal combustion engine. Two conduits extend into the plenum with one conduit being connected to the carburetor air intake filter unit or the lower section of the carburetor or the intake manifold and the other to the ambient atmosphere. The shutter arm is mounted to swing between positions blocking communication between the plenum and one or the other of said two conduits, the unblocked conduit being in communication with the plenum.

A muffler and a means for treating and reducing the adverse effects of the exhaust emissions of the engine are connected in series between the engine and the ambient atmosphere. A bypass pipe shunts the exhaust emissions treating means.

A second cylinder is provided which also is in communication with the control conduit and a second piston is housed therein, which piston has a piston rod attached thereto. Spring biasing means maintains the second piston in a first position when ambient air pressure prevails in the second cylinder. The piston rod extends through one end of the second cylinder and movable therewith is a butterfly valve which is located in the bypass pipe.

In normal operation with the vehicle travelling below the predetermined speed the ram air directed to the wind tunnel is not sufficient to overcome the bias of the spring on the shutter. As a consequence thereof the vacuum control valve is so positioned that the ambient air pressure is communicated to the control conduit and, hence, to each of the two cylinders. Under these conditions the piston in the first cylinder under the bias of its spring assumes the first position in which the hinged shutter arm in the exhaust plenum blocks the conduit leading to the atmosphere and so prevents any of the fumes in the plenum from being discharged directly to the atmosphere while allowing communication between the plenum and the conduit which leads to the engine air intake from where the fumes are redirected to subsequent firing cycles. The piston in the second cylinder under the bias of the spring action thereon is in the first position so that the butterfly valve in the bypass pipe prevents the exhaust products from discharging directly to the atmosphere. Consequently, the exhaust products from the muffler are directed to the treating means and only then are thereafter vented to the atmosphere.

When the vehicle is travelling at higher than the predetermined speed, the force from the ram air in the wind tunnel is sufficient to overcome the bias of the spring on the shutter changing the position of the vacuum control valve which is movable therewith. As a result of this movement, the control conduit is placed in communication with the intake manifold and low subatmospheric pressure is thus applied to the first and second cylinders.

The subatmospheric pressure applied to the first cylinder results in the piston therein moving the hinged shutter to a second position which blocks the conduit in the plenum leading to the engine air intake while allowing communication between the plenum and the conduit leading to the atmosphere.

The application of subatmospheric pressure to the second cylinder causes the piston therein to be moved to a second position shifting the butterfly valve in the bypass pipe to allow free flow therethrough thus allowing flow of exhaust emissions from the muffler directly to the atmosphere. Hence the treating agent in the treating means is not utilized when direct atmospheric emission of the exhaust products from the muffler does not present a pollution problem.

Other embodiments of the invention are hereinafter also set forth.

The invention accordingly consists in the features of construction, combination of elements and arrangement of parts which will be exemplified in the devices hereinafter described and of which the scope of application will be indicated in the appended claims.

DESCRIPTION OF THE PREFERRED EMBODIMENTS

Figure 1:
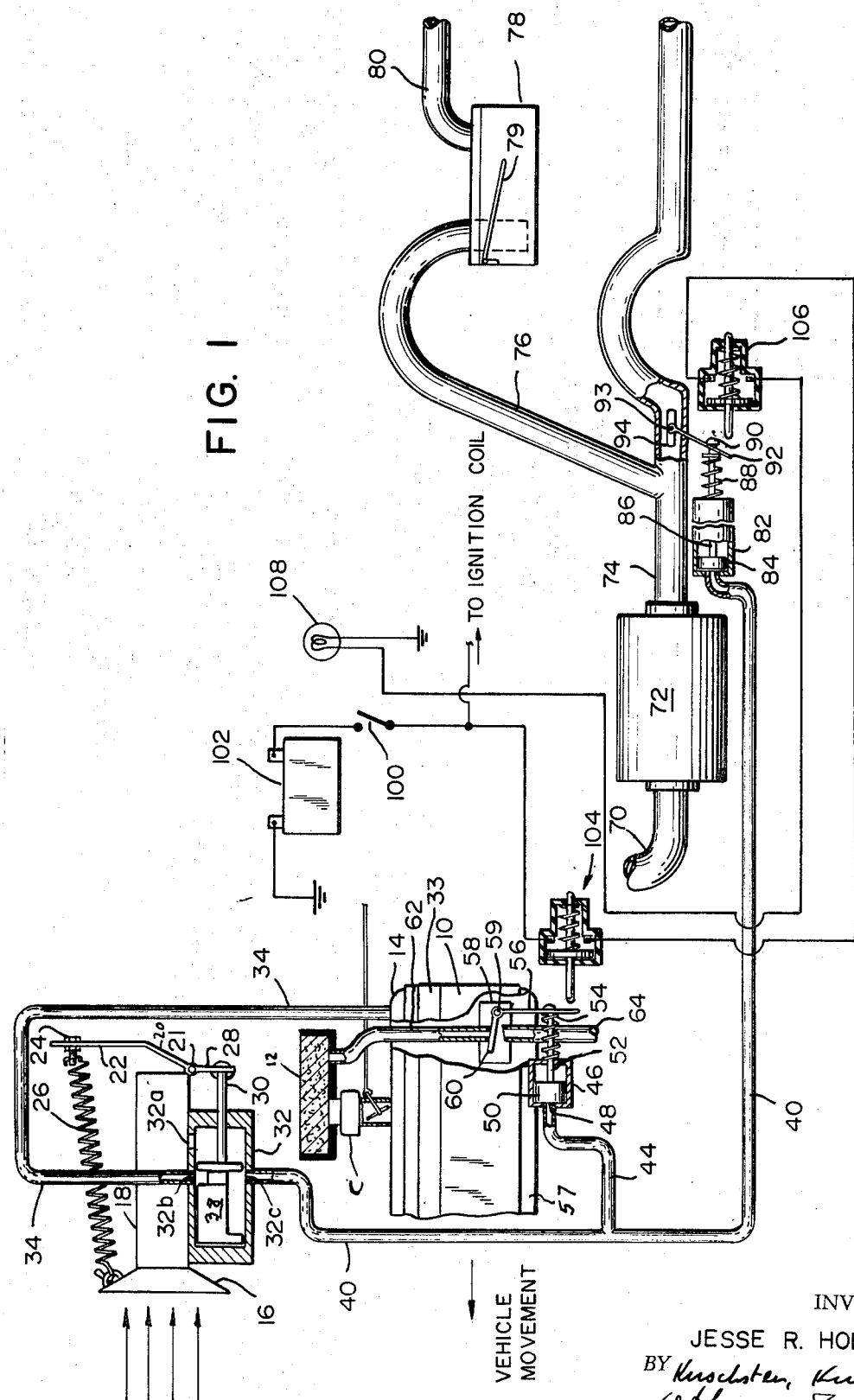
FIG. 1 is a schematic illustration showing the present invention.

In FIG. 1 an embodiment of the present invention is shown for controlling the discharge of emission products of a conventional vehicle internal combustion engine 10 which has an air intake filter unit 12 for a fuel carburetor C that leads to a gasoline/air intake manifold 14. Although the operation of the sundry embodiments of the inventions are described in detail with respect to gasoline/air mixture spark ignition internal combustion engines, it will be understood that the invention covers all types of internal combustion engines including, for example, diesel engines which conventionally employ liquid fuel slug injection. A ram air scoop 16 is provided for directing ram air to the intake end of a tunnel 18. A shutter 20 which is movable about a hinge 21 is located at the discharge end of tunnel 18. Attached to movable shutter 20 is a bracket 22 and an adjustment screw 24 is threaded through a tapped opening in bracket 22. A spring 26 is stretched between scoop 16 and adjustment screw 24. Attached to movable shutter 20 is a valve actuating arm 28 having a bifurcated tip that straddles a post 30 between fixed collars thereon. Post 30 extends through the end of valve body 32 to control the position of a valve spool 38 in said valve body.

Valve body 32 includes a port 32a which is in continuous communication with the atmosphere. A conduit 34 connects intake vacuum (subatmospheric or negative pressure) manifold 14 to port 32b of valve body 32. Valve spool 38 and valve body 32 constitute a conventional three-way valve as will be apparent to those skilled in the art. A control conduit 40 leads from valve port 32c of valve body 32 and in communication therewith is a branch control conduit 44 that leads to a cylinder assembly 46. Cylinder assembly 46 includes a port 48 on its left end with which control conduit 44 is in communication. Slidable within cylinder 46 is a piston 50 having a rod 52 which extends through the vented right end of the cylinder.

Cylinder 46 is fixed relative to the internal combustion engine 10 and a compression spring 54 is located about the portion of rod 52 that is outside the cylinder. The other end of the spring bears against an arm 56 having a slotted tip that straddles rod 52. Spring 54 forces arm 56 against a head at the tip of rod 52.

A crankcase plenum 58 is provided in communication with the engine oil crankcase 57 enabling the fumes from the crankcase to pass the plenum. It should be noted that some unburned hydrocarbons blow past the piston rings along with products of combustion and enter the oil crankcase and together with the oil fumes enter plenum 58. Arm 56 is connected to a shaft 59 that is journalled in and extends into plenum 58. A shutter 60 is secured to shaft 59 whereby movement of arm 56 in a counterclockwise direction, as viewed in FIG. 1, results in downward movement of the shutter. Movement of the arm in a clockwise direction results in upward movement of the shutter. A conduit 62 communicates between the plenum and the air intake filter unit 12. Although I have shown the conduit 62 running to the air intake filter unit of the carburetor, the actual point of connection of this conduit to the fuel intake system of the engine is not of critical importance, and it is within the scope of the invention to make such connection to the lower section of the carburetor or to the engine intake manifold. A further conduit 64 communicates between the plenum and the ambient atmosphere. The cooperation of shutter 60 and conduits 62 and 64 will hereinafter be described.

As is conventional, the exhaust manifold 33 of engine 10 via a tube 70 leads to a muffler 72. An exhaust tail pipe 74 attached to the output port of the muffler 72 receives the exhaust emissions from said muffler 72. If necessary a portion of exhaust tail pipe 74 may be curved (as can be seen in FIG. 1) to clear the rear axle. In parallel with exhaust tail pipe 74 upstream of the curved portion thereof is a pipe 76 which leads to a closed tank 78 (engine exhaust emissions treating means) which can have an emissions diverter 79 if desired or required. Tank 78 contains a catalyst, e.g. Monel pellets or platinum coated particles or a suitable treating medium, e.g., copper oxide or vanadium oxide particles or other catalysts for treating the exhaust emissions from engine so as to reduce pollution when the exhaust products are discharged therefrom. An exhaust pipe 80 leads from tank 78 with its end open to the atmosphere. The exhaust pipe 74 downstream of its junction with pipe 76 is a bypass in shunt with exhaust emissions treating means 78.

Control conduit 40 leads to a port in the left end of a cylinder 82 which houses a piston 84 having a piston rod 86 that extends through the vented right end thereof. A compression spring 88 abuts the outside surface of the right end of cylinder 82 and surrounds an extending portion of rod 86. A head 90 is located on the rightmost end of rod 86 and in contact with the head is an arm 92 which is secured at its opposite end to a shaft 93 that is journalled on and extends into exhaust pipe 74 downstream of the junction with pipe 76. The right end of spring 88 bears against arm 92. The tip of arm 92 is slotted and straddles rod 86. Connected to shaft 93 within exhaust pipe 74 is a butterfly valve 94.

As is conventional, an ignition switch 100 is in circuit with a vehicle battery 102. In series circuit with ignition switch 100, in addition to the conventional electrical equipment, is a normally open momentary switch 104 which is closed when arm 56 is moved to the right of the position shown in FIG. 1, as will hereinafter be described. In series circuit with switch 104 is another normally open momentary switch 106 which is closed when arm 92 is moved to the right of the position seen in FIG. 1, and in series circuit with the switches is a pilot light 108 that is connected to ground. The closing of switches 104 and 106 energizes a pilot light 108 which is situated within the driver's range of vision. Thus, when the vehicle is traveling at low speed, if the pilot light is not illuminated, one or both of the pollution controls is not set to operate.

In operation, ram air impinges on scoop 16 and is directed into the interior of tunnel 18 against shutter 20. When the vehicle is travelling below the predetermined speed, the force on the sutter from the ram air is not sufficient to overcome the bias of spring 26. As a consequence, valve spool 38 is positioned at the right in valve body 32 with ports 32a and 32c in communication with each other, so that control conduit 40 and secondary control conduit 44 are connected to the ambient atmosphere. Therefore, spring 54 maintains arm 56 in its rightmost position keeping shutter 60 in blocking contact with the otherwise open end of conduit 64 in plenum 58. Hence, the fumes in the crankcase flowing to plenum 58 are passed to the air filter unit 12 via conduit 62. The fumes then flow into the intake manifold to the combustion cylinders where the crankcase emissions are burned and their products of combustion are exhausted through the exhaust system of the engine.

Likewise, with control conduit 40 connected to the ambient atmosphere, piston 84 is at the right end of cylinder 82 as a result of the bias of spring 88. Consequently, butterfly valve 94 assumes a blocking position preventing passage of exhaust products from muffler 72 through exhaust tail pipe 74 directly to the atmosphere. The exhaust products from the muffler are thus directed through pipe 76 and into exhaust emissions treating means 78 where they are treated with the catalyst or a solid particulate chemical reactant contained therein with the treated exhaust products then being directed to the ambient atmosphere via exhaust pipe 80. The treatment of the exhaust emissions, bypassing through the catalyst or chemical reactant, reduces the toxic effects of the exhaust emissions directed to the atmosphere.

It will be understood that the tank shown in FIG. 1 as the treating means is exemplificative and that any other type of treating means known to the art can be employed, such, for example as an afterburner, or a liquid or solid particle reactant which nullifies or reduces the effect of toxic gases such as sulfur oxides and nitric oxides, or an engine exhaust emissions return to the engine combustion chambers with or without the assistance of a turbulence unit and with or without the addition of pressurized air and/or fuel.

Thus, it can be seen that when the vehicle is travelling at less than a predetermined speed the exhaust emissions from the engine are treated to reduce the pollutants they discharge to atmosphere, and the fumes from the crankcase are directed to the combustion chambers of the engine through the intake manifold and, after being burned in the combustion chambers, are exhausted through the exhaust system of the engine.

When the vehicle is travelling above the predetermined speed, the force of the ram air in tunnel 18 moves shutter 20 to the right stretching spring 26. This causes the spool in valve body 32 to be positioned so that ports 32b and 32c place control conduit 40 and secondary control conduit 44 in communication with the intake manifold (FIG. 1). Consequently, sub-atmospheric (negative) pressure is applied to cylinder 46 moving and maintaining the piston 50 at the left of cylinder 46 so that link connected hinged shutter arm 60 prevents communication between plenum 58 and conduit 64, thus leading the crankcase fumes directly to the ambient atmosphere. The application of sub-atmospheric pressure to the piston in cylinder 82 moves piston 84 to the left of cylinder 82 so that link connected butterfly valve 94 allows flow from muffler 72 directly through exhaust tail pipe 74 to the ambient atmosphere substantially reducing flow through treating tank 78, since the path of flow through the catalyst particles or chemicals in the treating tank 78 has a higher resistance than the unobstructed path of flow directly to the atmosphere through exhaust pipe 74.

It can readily be seen that when the vehicle is travelling above the predetermined speed the fumes from the crankcase and the engine emissions products are passed directly to the ambient atmosphere. However, when the vehicle is travelling at lower speeds — speeds at which the engine emissions products may present a pollution problem — the fumes from the crankcase are consumed in the firing chambers of the combustion engine while the exhaust emissions products from the engine are treated so as to minimize the pollution effects therefrom.

Figure 2:
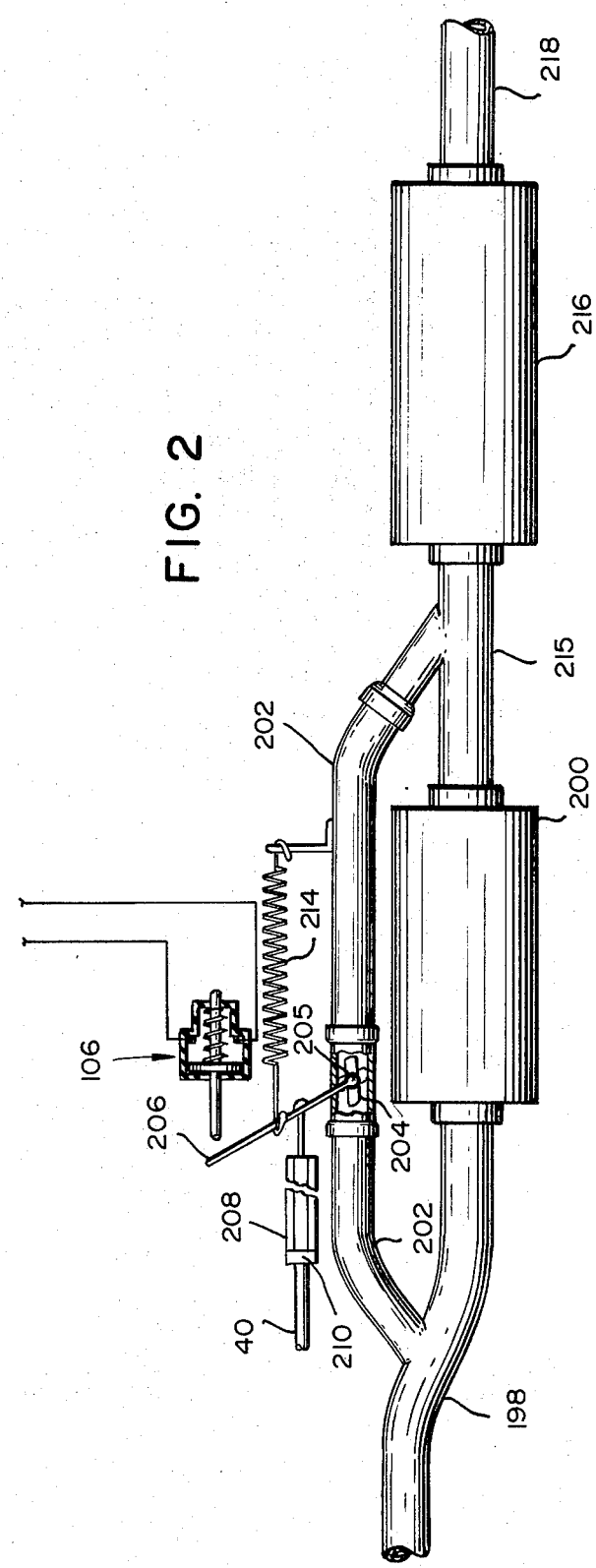
FIG. 2 is a schematic illustration of an alternate embodiment of the present invention.

In FIG. 2 of the drawings an embodiment of the present invention is shown wherein the exhaust emissions products from the exhaust manifold of the internal combustion engine are fed via a pipe 198 to a catalytic receptacle 200. In parallel with pipe 198 upstream of catalytic receptacle 200 is a bypass pipe 202 with a butterfly valve 204 housed therein and secured to a shaft 205 that is journalled for rotation in pipe 202. An arm 206 is provided that rotates shaft 205 and moves butterfly valve 204 between the position shown in dotted lines (flow blocking position) and the position shown in solid lines which allows flow through pipe 202. A cylinder 208 housing a piston 210 is provided with its attached piston rod extending through an opening in the cylinder body with the end of the rod passing through a clearance hole in the arm 206. The rod is headed at its end. A tension spring 214 keeps arm 206 and piston rod and piston 210 in rightmost positions absent a sub-atmospheric pressure being applied to the piston within the cylinder.

A pipe 215 connects outlet of catalytic receptacle 200 with muffler 216, with exhaust pipe 218 connecting said muffler to the atmosphere. Bypass pipe 202 including the butterfly valve unit is connected from pipe 198 to pipe 215 so as to lead to muffler 216.

It is to be appreciated that the embodiment shown in FIG. 2 may be used in lieu of the exhaust emissions treating system shown in FIG. 1, utilizing the remaining structure of FIG. 1 with cylinder 208 connected to control conduit 40. In the embodiment of FIG. 2 catalytic receptacle 200 is upstream of muffler 216 so that the exhaust emissions which are directed through the catalyst particles within the catalyst receptacle are at a higher temperature than they would be after passing through a muffler. This is because some types of catalysts function more efficiently at high temperatures.

In operation the embodiment of FIG. 2 works the same as the system of FIG. 1. Specifically, when the vehicle is travelling at/or above the designated speed, piston 208 will be in the position seen in FIG. 2 under the influence of the manifold negative pressure and spring 214 will be stretched with rod 206 positioned as illustrated. Butterfly valve 204 will be in the position shown in solid lines so that the exhaust products will bypass catalytic receptacle 200 via low resistance pipe 202 and be transferred to muffler 216 and then vented to atmosphere. If the vehicle is travelling below the predetermined speed, cylinder 208 will be connected to atmospheric pressure and spring 214 will move piston 210 and rod 206 to the right of the positions shown in FIG. 2 so that butterfly valve 204 assumes the blocking position shown in dotted lines which causes exhaust products to be passed through the catalyst particles in catalytic receptacle 200 and treated thereby and from where they are passed to muffler 216 and directed to atmosphere. When this occurs electric switch 106 is closed and electric switch 104 (FIG. 1) is closed, the pilot bulb 108 is illuminated, indicating that the crankcase and exhaust emissions units are in operation.

In both embodiments of the invention it is to be appreciated that the type of catalyst that is used may vary as is apparent. If desired, a dual catalyst system can be used, Platinum particles for treating the carbonaceous oxides, and Monel for treating the nitric oxides of the exhaust emissions.

Although negative pressure mechanism systems are shown it is to be appreciated that other systems, such as electric or hydraulic mechanism could equally well be used.

Figure 3:
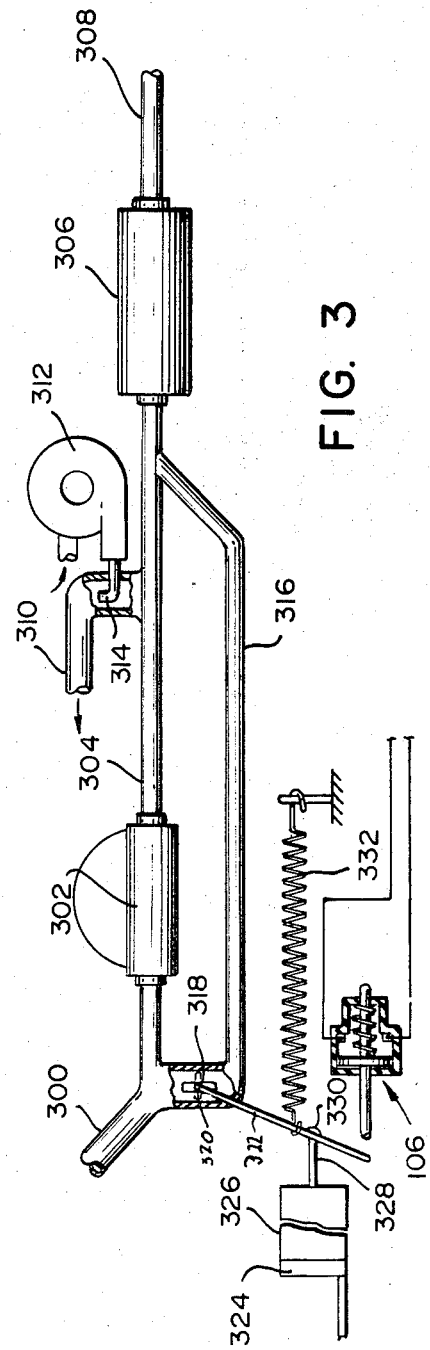
FIG. 3 is a schematic illustration of another alternative embodiment of said invention.

In FIG. 3 of the drawings a further embodiment of the present invention is shown in which a pipe 300 leading from an internal combustion engine is connected to a conventional turbulence unit 302. A pipe 304 connects turbulence unit 302 to a muffler 306 and an exhaust pipe 308 connects the muffler to atmosphere. A recycling pipe 310 is in communication with pipe 304 and leads to the air filter unit.

A compressor 312 which can be driven by any of the rotary parts of the vehicle or engine has a discharge pipe 314 which jets pressurized air into pipe 310 with the discharge pipe positioned so that the pressurized air is directed away from pipe 304.

A bypass pipe 316 is arranged to shunt turbulence unit 302 and pipe 310 as will hereinafter be described. Located in bypass pipe 316 is a butterfly valve 318 with the butterfly valve rotatable with a shaft 320 that is suitably journalled by the walls of pipe 316. An arm 322 is connected to shaft 320. A piston 324 is joused in a cylinder 326 with a piston rod 328 extending through the vented right end of cylinder 326. An opening is located at the bottom portion of arm 322 and piston rod 328 projects therethrough with a head 330 at the free end of the piston rod. A tension spring 332 biases arm 322 in a counterclockwise direction and urges piston 324 to the right of cylinder 326. The abutment of piston 324 with right end of cylinder 326 limits the counterclockwise rotation of arm 322 and when said arm is rotated in a counterclockwise direction as much as possible butterfly valve 318 is horizontal, i.e., in a blocking position. Under negative pressure piston 324 abuts the end of cylinder 326 to limit the clockwise rotation of arm 322, and when this occurs butterfly valve 318 is in a vertical, i.e., non-blocking position.

The embodiment of the invention shown in FIG. 3 is intended to replace the exhaust emissions treating structure shown in FIG. 1 with conduit 40 of FIG. 1 connected to cylinder 326.

In normal operation with the vehicle travelling below the predetermined speed atmospheric pressure will be directed to cylinder 326 and spring 332 will maintain arm 322 in its maximum counterclockwise position so that valve 318 assumes a horizontal position blocking flow through pipe 316. Consequently, the exhaust gases are passed through turbulence unit 302 to pipe 304 where a percentage of the gases, with the percentage determined by the pressure of the discharge from the compressor, is directed to pipe 310 for recycling through the combustion chambers of the engine, with the remaining exhaust gases directed through muffler 306 and to atmosphere via tail pipe 308. As a consequence thereof the exhaust products directed to atmosphere from pipe 308 have less objectionable emission products than if none of the gases were recycled as previously described.

If the vehicle is travelling above a predetermined speed a negative pressure is applied to cylinder 326, and piston 324 is spring biased to the left of end cylinder 326 so that rod 322 positions butterfly valve 318 in a vertical position in which position it does not block flow through pipe 316. The exhaust gases pass through pipe 316 in preference to passing through the turbulence unit and through pipe 304 since the resistance in pipe 316 is substantially less, and from pipe 316 they are directed to muffler 306 and atmosphere via exhaust pipe 308.

It thus will be seen that there are provided devices which achieve the various objects of the invention and which are well adapted to meet the conditions of practical use.

As various possible embodiments might be made in the embodiments above set forth, it is to be understood that all matter herein described or shown in the accompanying drawings is to be interpreted as illustrative and not in a limiting sense.

Having thus described the present invention there is claimed as new and desired to be secured by Letters Patent:

1. A system for controlling the discharge of exhaust products from a vehicle internal combustion engine comprising a ram air speed sensor, a first valve having first and second positions, linkage means connecting said first valve to said ram air speed sensor with said first valve being in the first position when the vehicle is travelling at and above a predetermined speed and in the second position when the vehicle is travelling below the predetermined speed, a source of fluid energy, a source of atmospheric pressure, a fluid motor, fluid conducting means connecting said first valve to said fluid motor, said fluid motor including a fluid operated power element having a rod, a muffler for the internal combustion engine, means for treating the exhaust products from the vehicle internal combustion engine so as to reduce atmospheric pollution by the products, a first conduit means placing said muffler and treating means in series with each other, a second conduit means connected to said first conduit means upstream of said treating means and leading to atmosphere, a second valve located in said second conduit means and having a first position for allowing flow therethrough and a second position for blocking flow therethrough, means connecting said second valve to said power element rod, said power element having a first position and a second position with said second valve in its first position when said power element is in its first position and said second valve in its second position when said power element is in its second position, means for biasing said power element to its second position, said first valve connecting said source of energy via said fluid conducting means to said fluid motor when in its first position to maintain said power element in its first position with said first valve connecting said fluid motor to atmosphere when in its second position so that said power element is in its second position.

2. A system for controlling the discharge of emission products from a vehicle internal combustion engine having a crank case comprising means for treating the exhaust products from the vehicle internal combustion engine so as to reduce atmospheric pollution by the products, speed sensing means for detecting when a vehicle is travelling at and above a predetermined speed and below the predetermined speed, means for directing all the exhaust products from the internal combustion engine to said treating means only when the vehicle is travelling below the predetermined speed as sensed by the sensing means and directing all the exhaust products to atmosphere and in so doing by-passing the treating means when the vehicle is travelling at and above the predetermined speed as sensed by the sensing means, means for directing all the fumes from the crank case directly to the atmosphere when the vehicle is travelling at and above the predetermined speed as sensed by the sensing means and for directing all the fumes to the internal combustion engine intake when the vehicle is travelling below the predetermined speed as sensed by the sensing means.

3. A system according to claim 2 wherein means is provided for producing a signal capable of human perception when the fumes from the crank case are directed to the internal combustion engine firing cylinders and the exhaust products from the engine are directed to the treating means.

4. A system for controlling the discharge of emission products from a vehicle internal combustion engine comprising means for treating the exhaust gases from the vehicle internal combustion engine so as to reduce atmospheric pollution by the gases and means for directing all the exhaust gases from the internal combustion engine to said treating means when the vehicle is travelling below a predetermined speed and for directing all the exhaust gases directly to atmosphere and by-passing the treating means when the vehicle is travelling at and above the predetermined speed, means for directing the fumes from the crank case of the internal combustion engine to atmosphere when the vehicle is travelling above the predetermined speed and for directing the fumes to the internal combustion engine intake when the vehicle is travelling below the predetermined speed, said fumes directing means including a plenum in communication with the crank case, means in communication with the internal combustion engine firing cylinders, a first conduit connected to said means in communication with the internal combustion engine firing cylinders and to said plenum, a second conduit in communication with said plenum and the atmosphere and means for blocking communication between said plenum and said second conduit when the vehicle is travelling below the predetermined speed and for blocking communication with the plenum and the first conduit when the vehicle is travelling above the predetermined speed.

5. A system according to claim 4 wherein said blocking means includes a flow control element in said plenum, said flow control element movable to a first position wherein communication between the plenum and the first conduit is prevented and a second position wherein communication between the plenum and the second conduit is prevented, and means for moving the flow control element to the first position when the vehicle is travelling at and above the predetermined speed and to the second position when the vehicle is travelling below the predetermined speed.

6. A system according to claim 5 further including means for producing a first signal when the vehicle is travelling at and above the predetermined speed and a second signal when the vehicle is travelling below the predetermined speed, means connecting said flow control element moving means to said signal producing means with said moving means moving the flow control element to the first position upon receiving the first signal and to the second position upon receiving the second signal.

7. A system according to claim 6 wherein said flow control element moving means is a fluid motor, said fluid motor including a cylinder having a piston housed therein, said piston movable between a first and a second position and said flow element movable therewith, said flow element being in its first position when the piston is in the first position and in its second position when the piston is in its second position, a source of fluid energy, said signal producing means including a valve means movable between a first and second position and connected to atmosphere and to the energy source and placed in the first position when the vehicle is travelling at and above the predetermined speed so as to connect the cylinder to the energy source and in a second position when the vehicle is travelling below the predetermined speed to connect said cylinder to atmosphere, means maintaining said piston in the second position when the cylinder is communicated to atmosphere with the piston in the first position when the cylinder is connected to the energy source.

8. A system according to claim 7 wherein an intake manifold is provided for the internal combustion engine, said source of energy defined by the vacuum pressure in the intake manifold.

9. A system for controlling the discharge of fumes from the crank case of a vehicle internal combustion engine comprising an internal combustion engine, said internal combustion engine having a crank case, speed sensing means for detecting when a vehicle is travelling at and above a predetermined speed and below the predetermined speed, means for directing all the fumes from the crank case directly to atmosphere when the vehicle is travelling at and above the predetermined speed as sensed by the speed sensing means and for directing all the fumes to the internal combustion engine intake when the vehicle is travelling below the predetermined speed as sensed by the sensing means.

10. A system according to claim 9 wherein said directing means includes a plenum in communication with the crank case, means in communication with the internal combustion engine firing cylinders, a first conduit connected to said means in communication with said internal combustion engine firing cylinders and to said plenum, a second conduit in communication with said plenum and the ambient and means for blocking communication between said plenum and said second conduit when the vehicle is travelling below the predetermined speed and for blocking communication with the plenum and the first conduit when the vehicle is travelling at and above the predetermined speed.

11. A system according to claim 10 wherein said blocking means includes a flow control element in said plenum, said flow control element movable to a first position wherein communication between the plenum and the first conduit is prevented and a second position wherein communication between the plenum and the second conduit is prevented, and means for moving the flow control element to the first position when the vehicle is travelling at and above the predetermined speed and to the second position when the vehicle is travelling below the predetermined speed.

12. A system according to claim 11 wherein said speed sensing means includes means for producing a first signal when the vehicle is travelling at and above the predetermined speed and a second signal when the vehicle is travelling below the predetermined speed, means connecting said flow control element moving means to said signal producing means with said flow control means moving the flow control element to the first position upon receiving the first signal and to the second position upon receiving the second signal.

13. A system according to claim 12 wherein said flow control element moving means is a fluid motor, said fluid motor including a cylinder having a piston housed therein, said piston movable between a first and a second position and said flow element movable therewith, said flow element being in its first position when the piston is in the first position and in its second position when the piston is in its second position, a source of fluid energy, said signal producing means including a valve means movable between a first and second position and connected to atmosphere and to the energy source and placed in the first position when the vehicle is travelling at and above the predetermined speed so as to connect the cylinder to the energy source and in a second position when the vehicle is travelling below the predetermined speed to connect said cylinder to atmosphere, means maintaining said piston in the second position when the cylinder is communicated to atmosphere with the piston in the first position when the cylinder is connected to the energy source.

14. A system according to claim 13 wherein an intake manifold is provided for the internal combustion engine, said source of energy defined by the vacuum pressure in the intake manifold.

* * * * *